United States Patent
Lim

(10) Patent No.: US 7,651,234 B2
(45) Date of Patent: Jan. 26, 2010

(54) BACKLIGHT ASSEMBLY AND LIQUID CRYSTAL DISPLAY HAVING THE SAME

(75) Inventor: Dae San Lim, Anyang-si (KR)

(73) Assignee: LG. Display Co., Ltd., Seoul (KR)

( * ) Notice: Subject to any disclaimer, the term of this patent is extended or adjusted under 35 U.S.C. 154(b) by 107 days.

(21) Appl. No.: 11/412,801

(22) Filed: Apr. 27, 2006

(65) Prior Publication Data

US 2007/0030694 A1   Feb. 8, 2007

(30) Foreign Application Priority Data

Aug. 8, 2005   (KR) ...................... 10-2005-0072076

(51) Int. Cl.
  *G09F 13/04* (2006.01)
  *F21V 13/00* (2006.01)
  *F21V 7/04* (2006.01)
  *G02F 1/1335* (2006.01)

(52) U.S. Cl. .................. 362/97.3; 362/612; 362/29; 362/30; 362/228; 362/231; 362/242; 362/244; 349/61; 349/62; 349/64; 313/508

(58) Field of Classification Search .................. 362/29, 362/30, 225, 228, 231, 240, 242, 244, 249, 362/252, 612, 800, 97.3; 313/500, 506, 508; 349/61–71
See application file for complete search history.

(56) References Cited

U.S. PATENT DOCUMENTS

| | | | |
|---|---|---|---|
| 7,229,194 B2 * | 6/2007 | Liu et al. ..................... | 362/225 |
| 7,314,296 B2 * | 1/2008 | Machi et al. ................. | 362/470 |
| 2004/0213017 A1 * | 10/2004 | Chou et al. .................. | 362/558 |
| 2005/0001537 A1 * | 1/2005 | West et al. ................... | 313/500 |
| 2006/0087866 A1 * | 4/2006 | Ng et al. ...................... | 362/612 |
| 2006/0203466 A1 * | 9/2006 | Noh et al. ..................... | 362/29 |
| 2007/0035966 A1 * | 2/2007 | Ide .............................. | 362/608 |

FOREIGN PATENT DOCUMENTS

JP   2004-303578   10/2004

OTHER PUBLICATIONS

First Office Action for corresponding Chinese Patent Application Serial No. 200610086594.8, dated Sep. 28, 2007.

* cited by examiner

*Primary Examiner*—Sharon E Payne
*Assistant Examiner*—Sean P Gramling
(74) *Attorney, Agent, or Firm*—Brinks Hofer Gilson & Lione

(57) ABSTRACT

A backlight assembly for a liquid crystal display device is disclosed with high efficiency and high brightness. The backlight assembly includes a light source in which a first light emitting diode and a second light emitting diode are combined, a board where the light source is mounted, and optical sheets arranged in front of the light source. By alternately arranging a front emitting type LED and a side emitting type LED in various structures, high efficiency and high brightness may be obtained using a small number of light emitting diodes.

24 Claims, 19 Drawing Sheets

BACKLIGHT ASSEMBLY AND LIQUID CRYSTAL DISPLAY HAVING THE SAME

The present invention claims the benefit of Korean Patent Application No. 72076/2005, filed in Korea on Aug. 8, 2005, which is hereby incorporated by reference.

BACKGROUND

The present disclosure relates to a backlight assembly for a liquid crystal display, and specifically, to a backlight assembly with high efficiency and brightness.

DESCRIPTION OF THE RELATED ART

A liquid crystal display ("LCD") device displays an image using a dielectric anisotropy of liquid crystal, a twist angle of which varies with an applied voltage. Because the LCD is slim and lightweight and can be driven at a low voltage, it is widely used as a display device for portable electronic equipment and for large-sized display devices such as a monitor.

The LCD includes two substrates where transparent conductive layers are formed, a liquid crystal layer where liquid crystals are injected between the two substrates, polarizers, compensation films, and color filters. The LCD has a plurality of liquid crystal cells. The liquid crystal cells do not emit light themselves. Therefore, since the liquid crystal cells are not self-luminous, the LCD requires a backlight assembly.

The backlight assemblies are classified into edge type backlight assemblies where a light source is located at the front or side of the screen and direct type backlight assemblies where a light source is located at the rear of the screen. As the screen becomes larger and high image quality is increasingly demanded, the direct type backlight assemblies are more widely used. Examples of the light source for the backlight assembly include electro luminescence ("EL"), cold cathode fluorescent lamp ("CCFL"), and hot cathode fluorescent lamp ("HCFL"). Among them, the CCFL is widely used for an LCD with the larger-sized screen because it can be formed without substantial thickness and allows for a thinner LCD device.

In the CCFL type backlight assembly, mercury sealed inside the fluorescent lamp is combined with metal and thus amalgam is easily formed. Consequently, the lifespan of the lamp is reduced, and brightness varies greatly according to temperature change. Also, the use of toxic mercury causes a problem for waste disposal of the toxic chemical.

In light of these problems, a backlight assembly using a light emitting diode (LED) may be desirable. The use of red, green and blue LEDs makes it possible to implement a high-brightness backlight assembly because they can provide the miniaturization of the backlight assembly and uniformity of light.

Hereinafter, a related art LCD will be described with reference to FIGS. 1, 2A and 2B.

FIG. 1 is an exploded perspective view of a related art LCD using LEDs. Referring to FIG. 1, the related art LCD includes a liquid crystal panel 15, a top case 16 for protecting the liquid crystal panel 15, a plurality of LEDs 12 used as a light source, a plurality of printed circuit boards ("PCB") 14 for supplying a voltage to the LEDs 12, optical sheets 10 for diffusing and condensing the light generated from the LEDs 12, an intermediate light guide plate 11 used as a light scattering unit, a lower case 17 provided below the LEDs 12, and a reflection plate (not shown) for reflecting the light from the LEDs 12 toward the liquid crystal panel 15.

For the LEDs 12 of the LCD, side emitting type LEDs are used because they can mix the light uniformly and have brightness stabilization. The LEDs 12 include red (R), green (G) and blue (B) LEDs and are connected to electrode patterns of the PCBs 14 to generate light when a voltage is supplied thereto. The light from the R, G and B LEDs 12 is mixed together to emit a white (W) light.

FIG. 2A is a sectional view of the LED of the related art LCD and FIG. 2B is a graph of brightness with respect to angles of the LED in the related art LCD. Referring to FIG. 2A, the LED 12 of the related art LCD includes a light emitting chip 22, a lens 21, a body 23, and a PCB 14. A side emitting type LED that emits light from its sides is used as the LED 12. The light from the light emitting chip 22 is diverged from the sides of the LED 12 through the lens 21.

Referring to FIG. 2B, the side emitting type LED 12 exhibits high brightness at angles ranging from −10° to 30° and angles ranging from 150° to 190° with respect to the light emitting chip 22. Accordingly, many side emitting type LEDs 12 are required to provide uniform brightness.

The number of the LEDs 12 may be changed according to the size of the liquid crystal panel 15. In the LCD, the side emitting type LEDs 12 that can mix the light uniformly are used for the brightness stabilization. However, because the related art backlight assembly has to include the intermediate light guide plate 11 so as to provide sufficient brightness to the liquid crystal panel 15, its structure is complicated and its thickness increases. In addition, a plurality of side emitting type LEDs must be used, resulting in increases of power consumption.

SUMMARY

Accordingly, the present disclosure is directed to a backlight assembly for an LCD, where front emitting type LEDs and side emitting type LEDs are arranged in combination with one another.

In a first aspect, a backlight assembly includes a light source including a first light emitting diode (LED) and a second LED. A main emission direction of the first LED is different from a main emission direction of the second LED. The light source is disposed on the board. At least one optical sheet is arranged in front of the light source.

In a second aspect, a liquid crystal display device includes a liquid crystal panel for displaying an image. A backlight assembly for emitting light to the liquid crystal panel includes a light source in which a first light emitting diode (LED) and a second light emitting diode (LED) are adjacent to one another. The first LED is a different type than the second LED.

In a third aspect, a backlight assembly includes one or more front-emitting light emitting diodes (LEDs) and one or more side-emitting LEDs. The one or more side-emitting LEDs are located adjacent to at least one of the front-emitting LEDs. The assembly further includes at least one board housing the front-emitting LEDs and the side-emitting LEDs.

High efficiency and high brightness may be obtained by alternately arranging the front emitting type LED and the side emitting type LED. In addition, since the liquid crystal display device provides high efficiency and stabilized brightness, an intermediate light guide plate can be omitted, thereby reducing the manufacturing cost of the liquid crystal display device.

It is to be understood that both the foregoing general description and the following detailed description of the present disclosure are exemplary and explanatory and are intended to provide further explanation of the embodiments as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
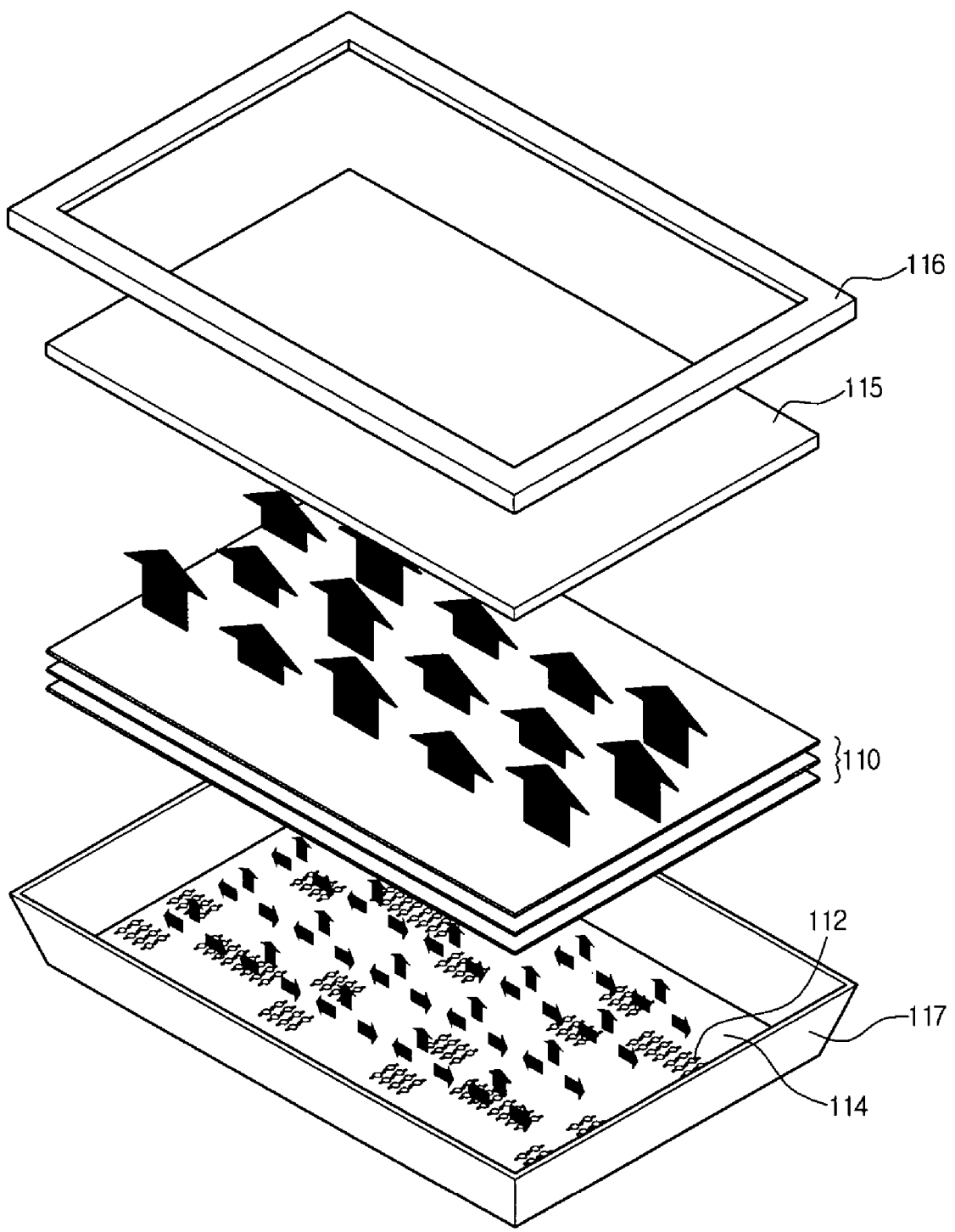
FIG. 3 is an exploded perspective view of an LCD using LEDs according to one embodiment.

FIG. 3 is an exploded perspective view of an LCD using LEDs according to the present invention. Referring to FIG. 3, the LCD according to the present disclosure includes a liquid crystal panel 115 for displaying an image, a top case 116 for protecting the liquid crystal panel 115, a plurality of LEDs 112 used as a light source, a PCB 114 for supplying a voltage to the LEDs 112, optical sheets 110 for diffusing and condensing the light generated from the LEDs 112 and irradiating the diffused and condensed light onto the liquid crystal panel 115, a bottom case 117 provided under the LEDs 112, and a reflection plate (not shown) provided on the bottom case 117 and the PCB 114 to reflect the light from the LEDs 112 toward the liquid crystal panel 115. The PCB 114 is connected to the LEDs 112 to supply a voltage thereto. The LEDs 112 are provided with the combination of front emitting type LEDs and side emitting type LEDs.

The surfaces of lenses provided on the front emitting type LEDs are formed as a dome shape such that the light from the LEDs may be emitted upwards, thereby increasing the luminous efficiency. Also, the side emitting type LEDs emit light laterally, thereby providing uniform and stabilized brightness. In this manner, high efficiency and high brightness may be simultaneously obtained by utilizing a combination of the front emitting type LEDs and the side emitting type LEDs.

Figure 1:
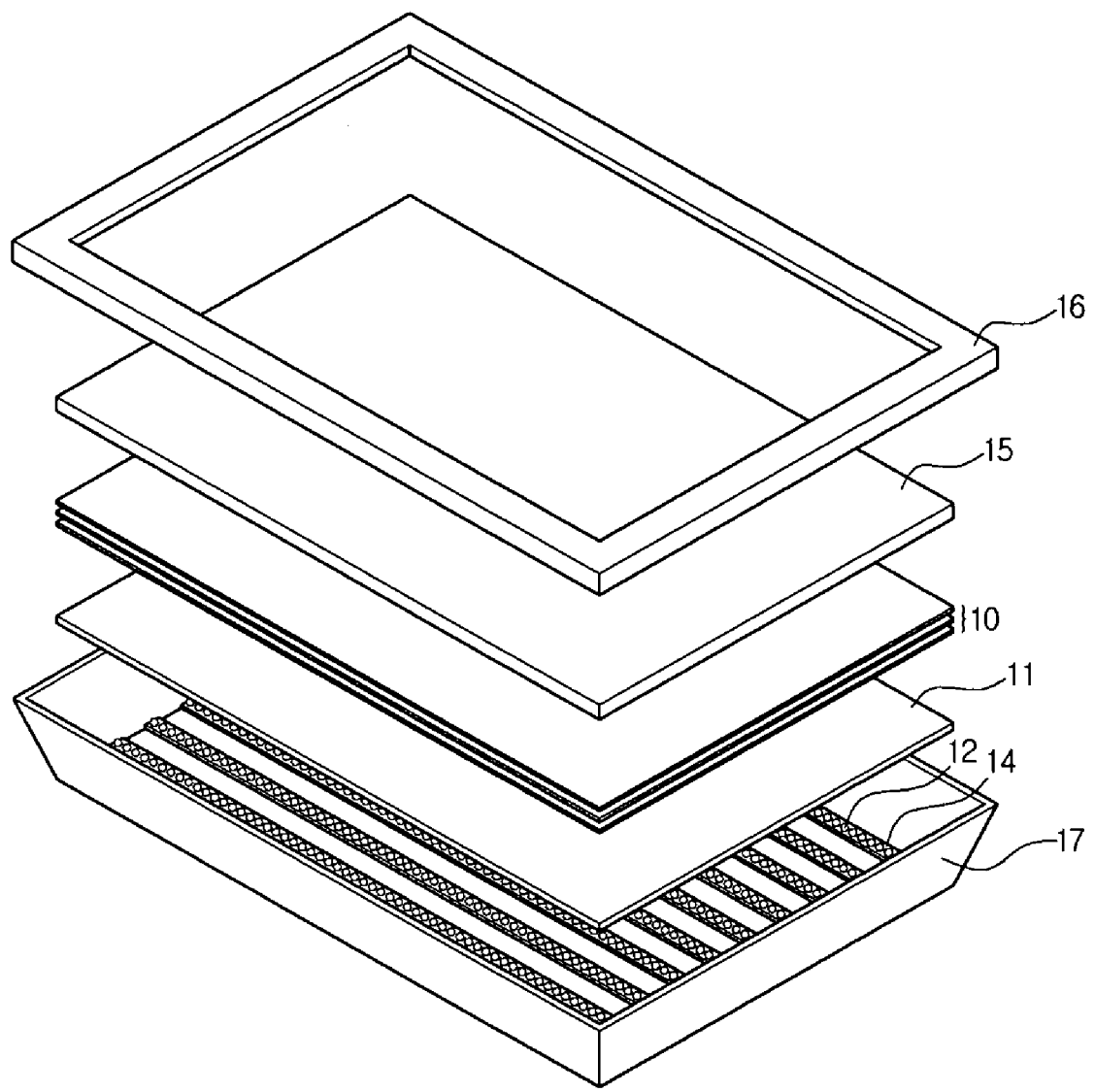
FIG. 1 is an exploded perspective view of a related art LCD using LEDs.
Figure 2A:
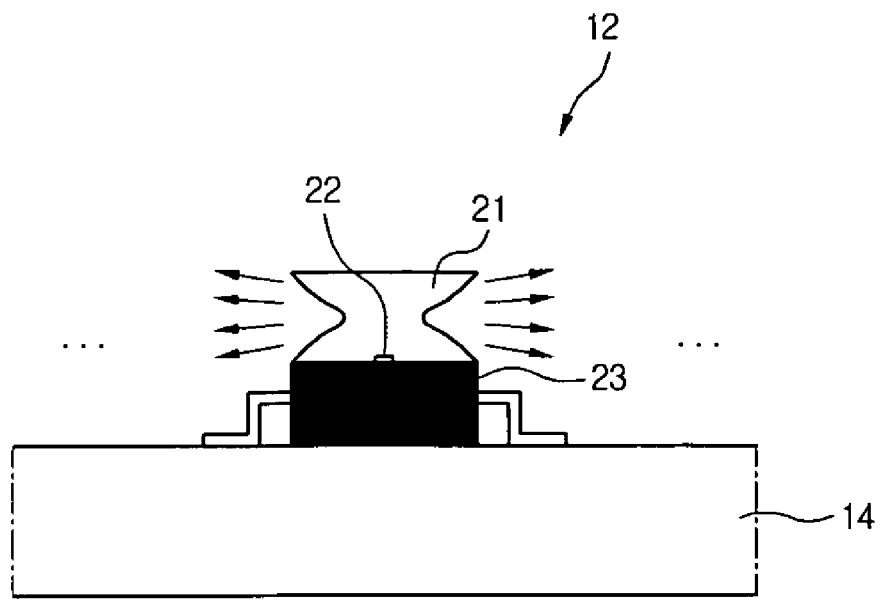
FIG. 2A is a sectional view of the LED of the related art LCD.
Figure 2B:
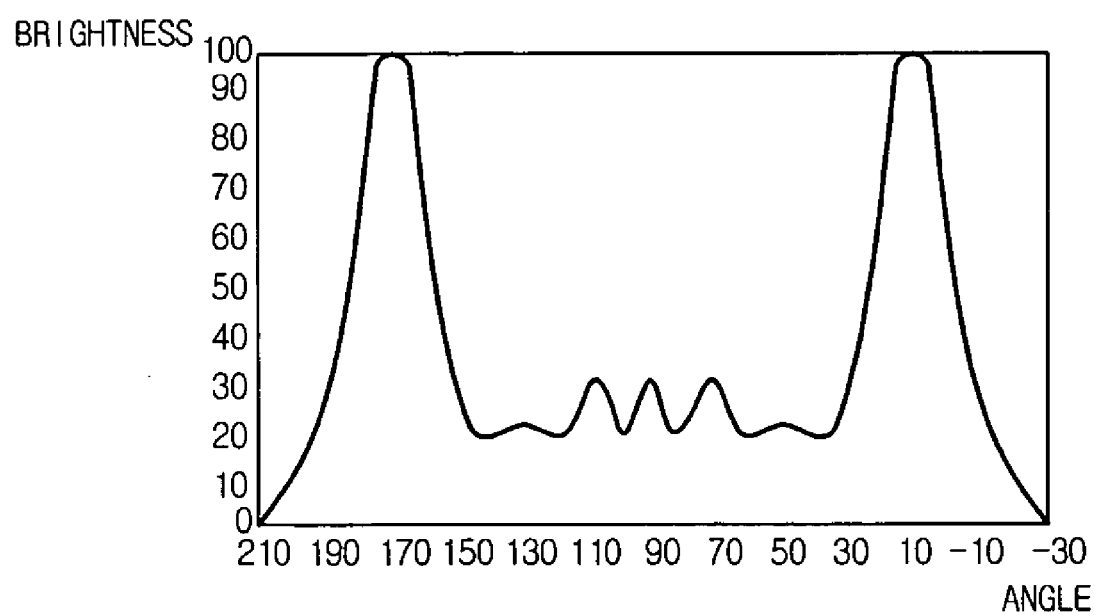
FIG. 2B is a graph of brightness with respect to angles of the LED in the related art LCD.

The LCD with high efficiency and stabilized brightness may be implemented by the combination of the front emitting type LEDs and the side emitting type LEDs. Therefore, the related art intermediate light guide plate (11 in FIG. 1) provided for high efficiency and brightness stabilization may be omitted.

Figure 4:
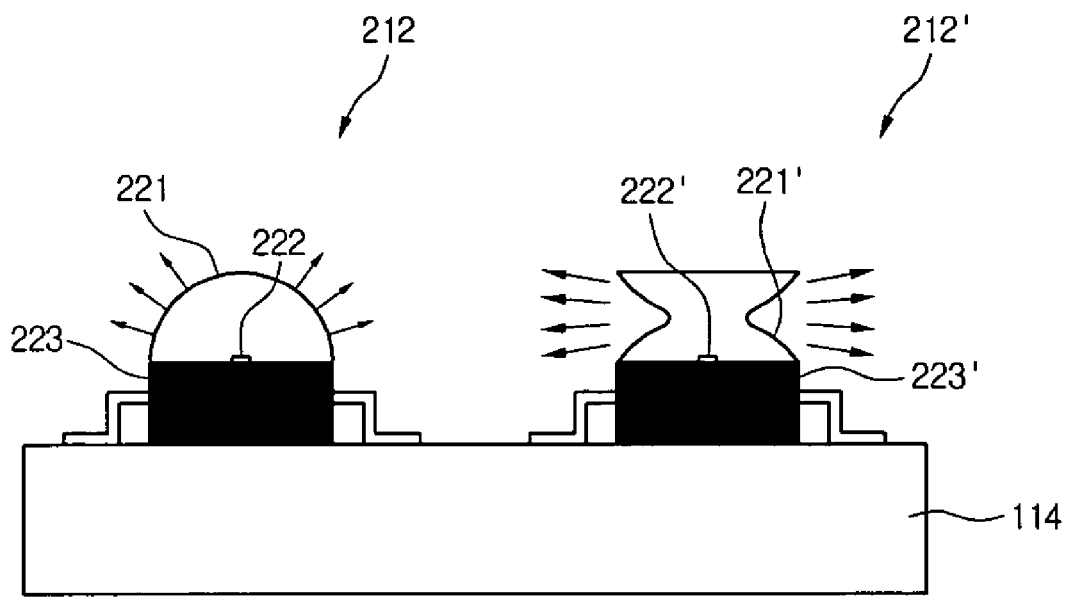
FIG. 4 is a sectional view of the LED according to one embodiment.

FIG. 4 is a sectional view of an LED according to the present invention. Specifically, a front emitting type LED 212 and a side emitting type LED 212' are illustrated in FIG. 4. The front emitting type LED 212 and the side emitting type LED 212' are mounted on a PCB 114 and arranged spaced apart from each other by a predetermined distance.

The front emitting type LED 212 and the side emitting type LED 212' include lenses 221 and 221', respectively, for determining light emitting positions. They also include light emitting chips 222 and 222', and bodies 223 and 223' connected to the PCB 114, respectively.

The front emitting type LED 212 and the side emitting type LED 212' are alternately arranged. When a voltage is supplied through patterns of the PCB 114, the light emitting chips 222 and 222' generate light. Then, the front emitting type LED 212 emits light upward through the dome-shaped lens 221, while the side emitting type LED 212' emits light laterally with the side type lens 221'.

Accordingly, the light source having the LEDs of the present embodiments mixes the upward emitted light and the laterally emitted light, thereby generating light with improved efficiency and uniform brightness.

Figure 5A:
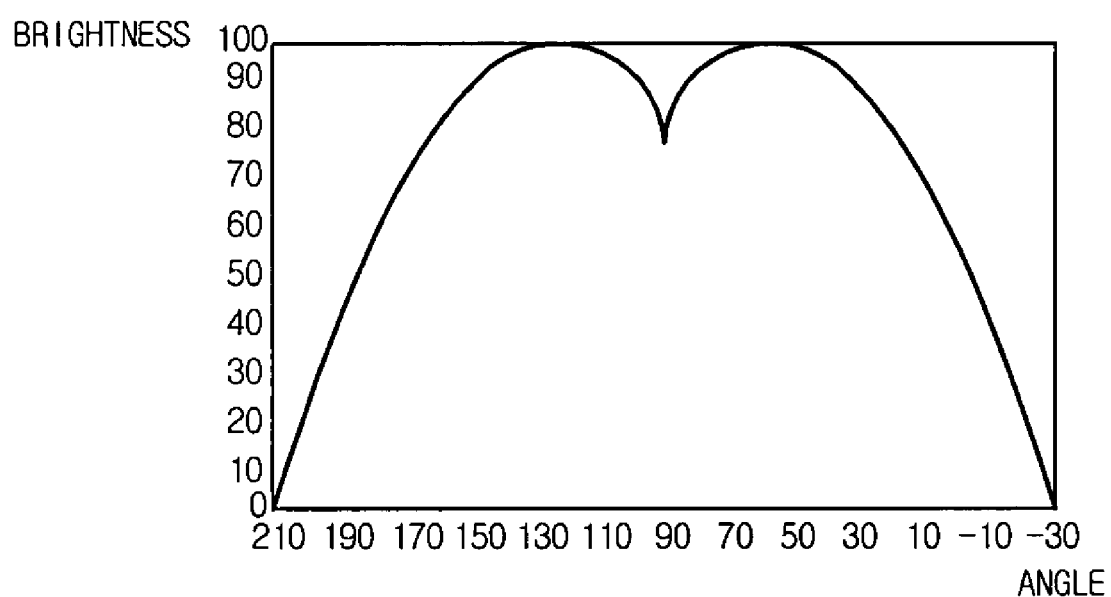
FIG. 5 is a graph of brightness with respect to angles of the LED according to one embodiment.

FIG. 5A is a graph of brightness with respect to angles of the LED according to one embodiment. Specifically, FIG. 5A is a graph of brightness for the angles for the light emitting chip 222 of the front emitting type LED 212 with respect to the light emitting chip 222. The front emitting type LED 212 exhibits high brightness at angles ranging from 30° to 150° with respect to the light emitting chip 222. Therefore, the front emitting type LED 212 has high efficiency because most of light is emitted from the upper surface of the lens 221.

Figure 5B:
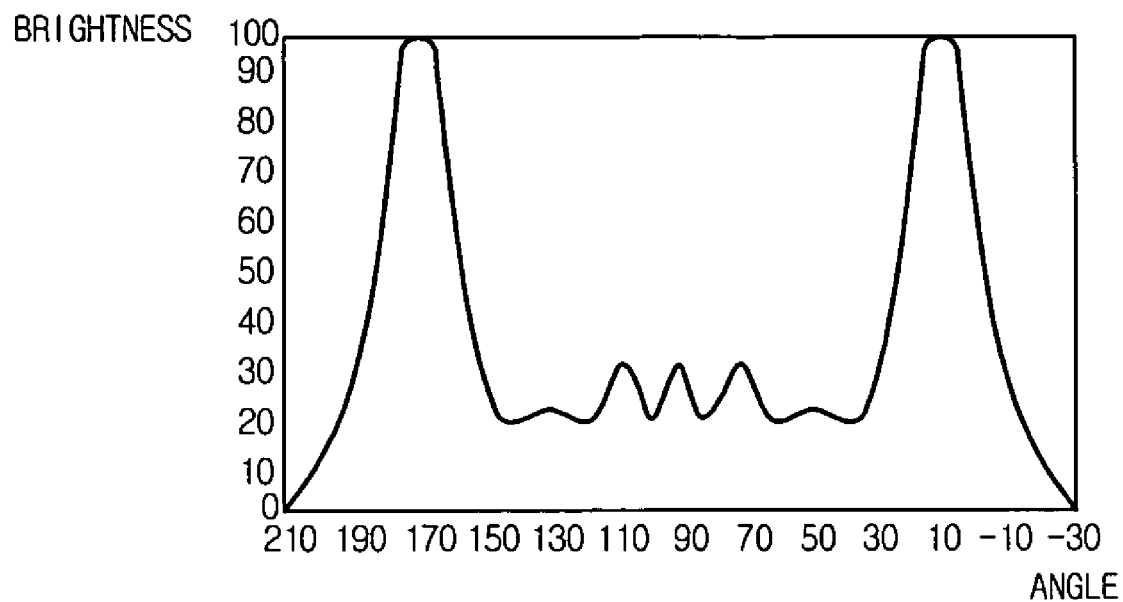

FIG. 5B is a graph of brightness with respect to angles for the light emitting chip 222' of the side emitting type LED 212'. Specifically, FIG. 5B is a graph of brightness for the angles for the light emitting chip 222' of the side emitting type LED 212' with respect to the light emitting chip 222'. The side emitting type LED 212' exhibits high brightness at angles ranging from −10° to 30° and angles ranging from 150° to 190° with respect to the light emitting chip 222'. Therefore, the brightness is stabilized because most of light is emitted from the sides of the lens 221'.

Figure 5C:
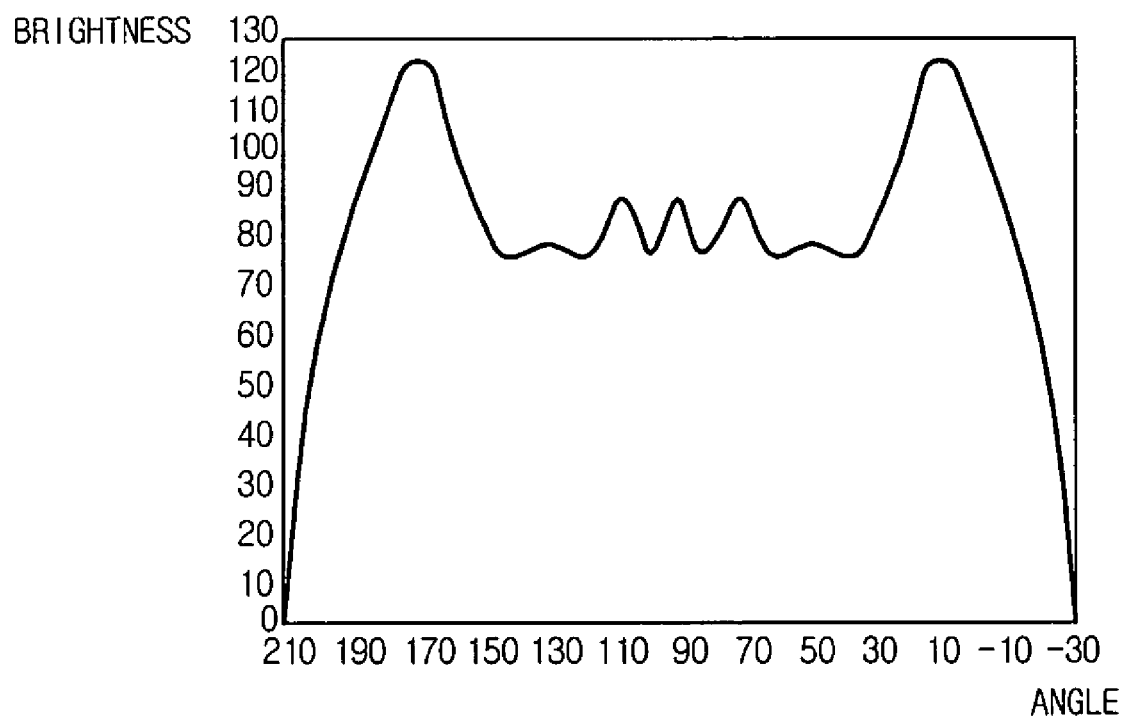

FIG. 5C is a graph of brightness with respect to angles when the front emitting type LED 212 and the side emitting type LED 212' are alternately arranged. In this embodiment, the LCD may obtain high efficiency and stabilized brightness at angles ranging from −10° to 190°.

Therefore, compared with an LCD having only the side emitting type LED, the LCD having a combination of the front emitting type LED 212 and the side emitting type LED 212' can reduce the number of LEDs and stabilize brightness. Also, since the intermediate light guide plate (11 in FIG. 1) is not required, the cost and thickness of the LCD may be reduced. Due to the high efficiency and the stabilized brightness, the power consumption of the LCD may be reduced for the same brightness of the related art LCD having only the side emitting type LED. In alternate embodiments, various types of LEDs may be combined to improve the brightness of a display.

Figure 6A:
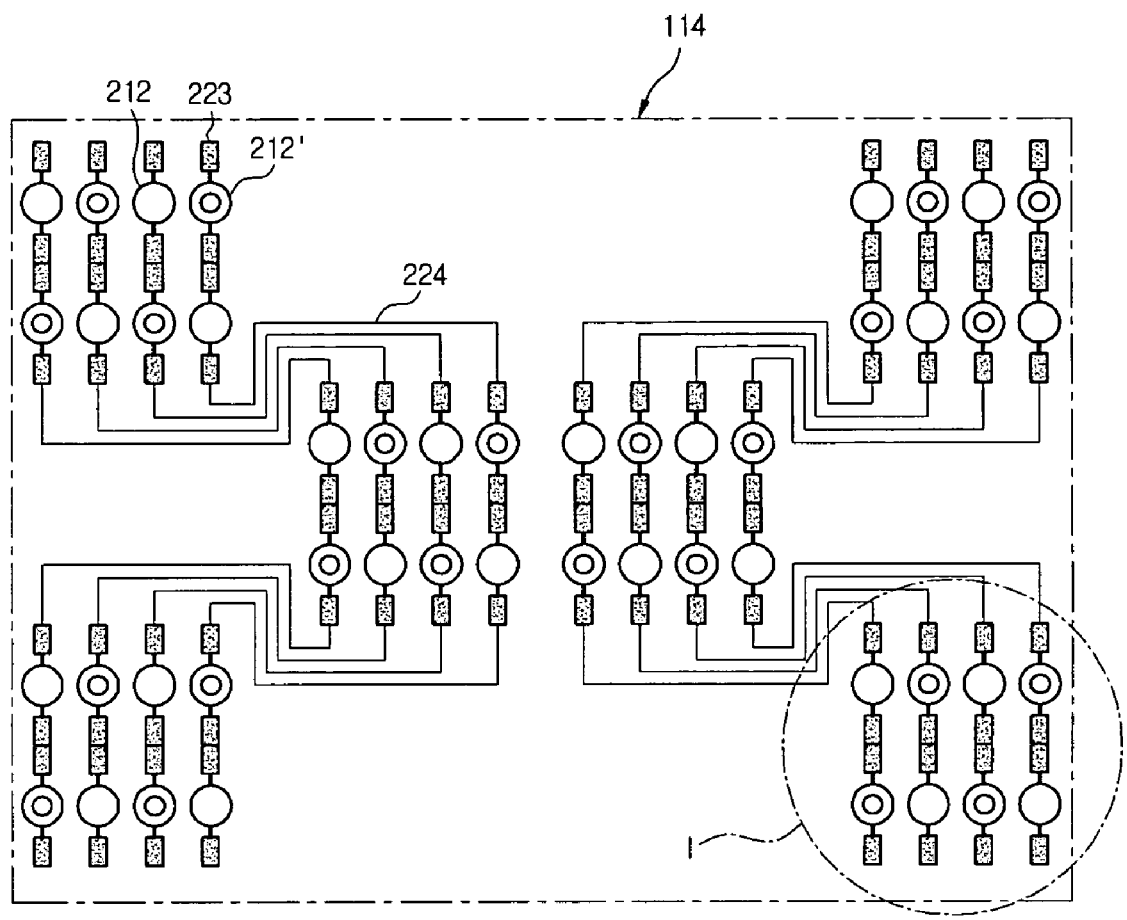
FIG. 6 is a view illustrating a structure of an LED according to one embodiment.
Figure 6B:
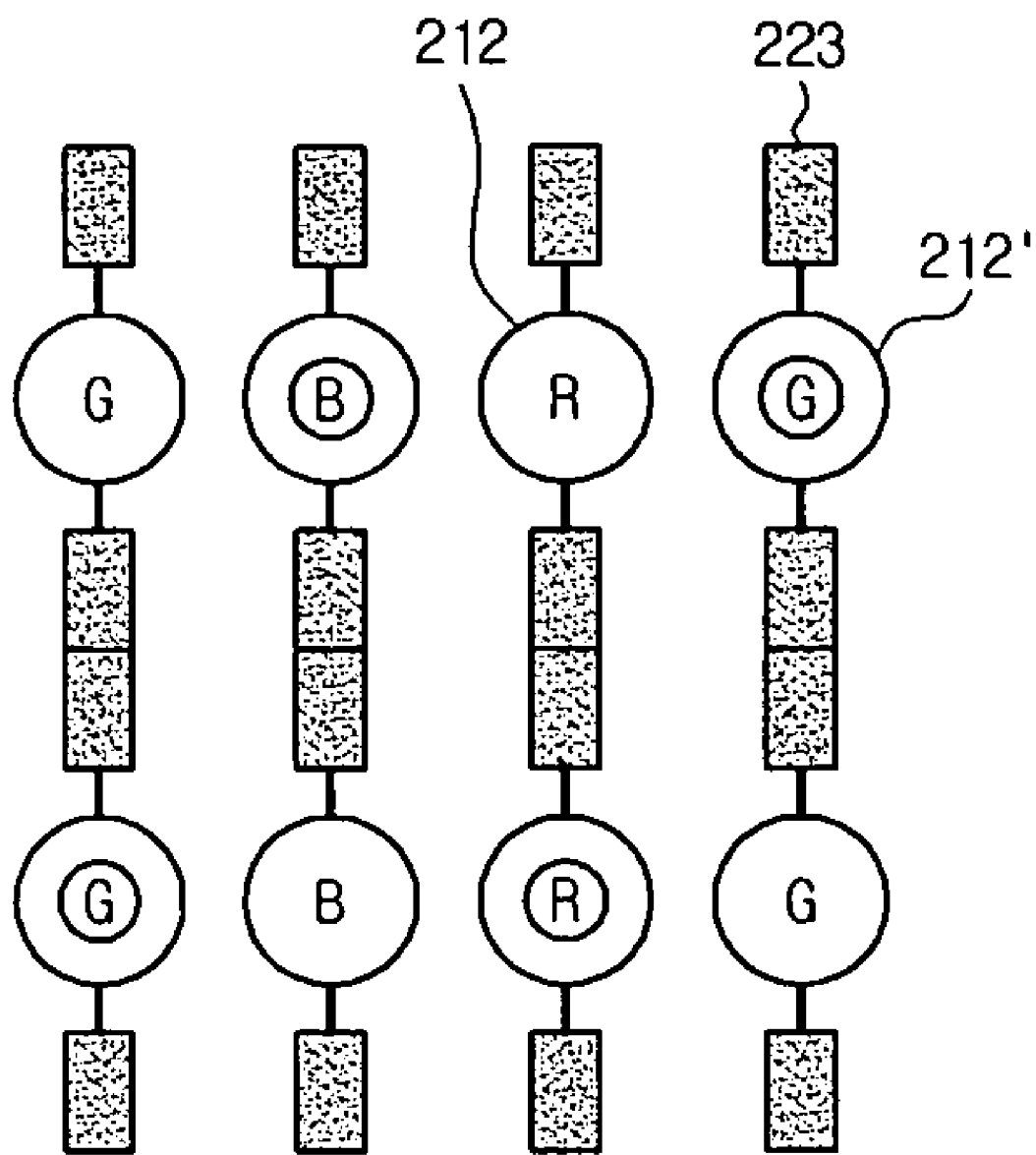
Figure 6C:
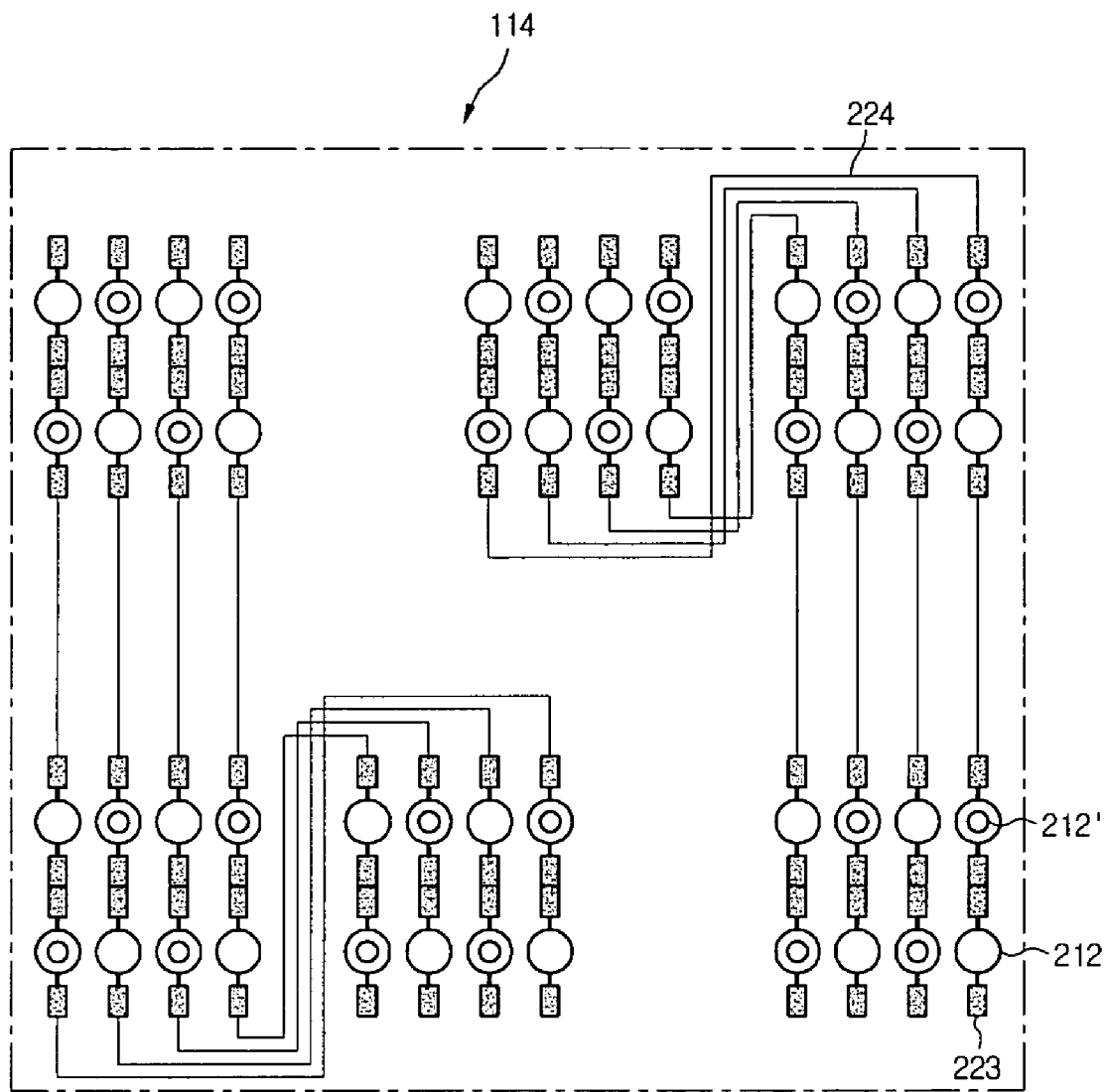
Figure 6D:
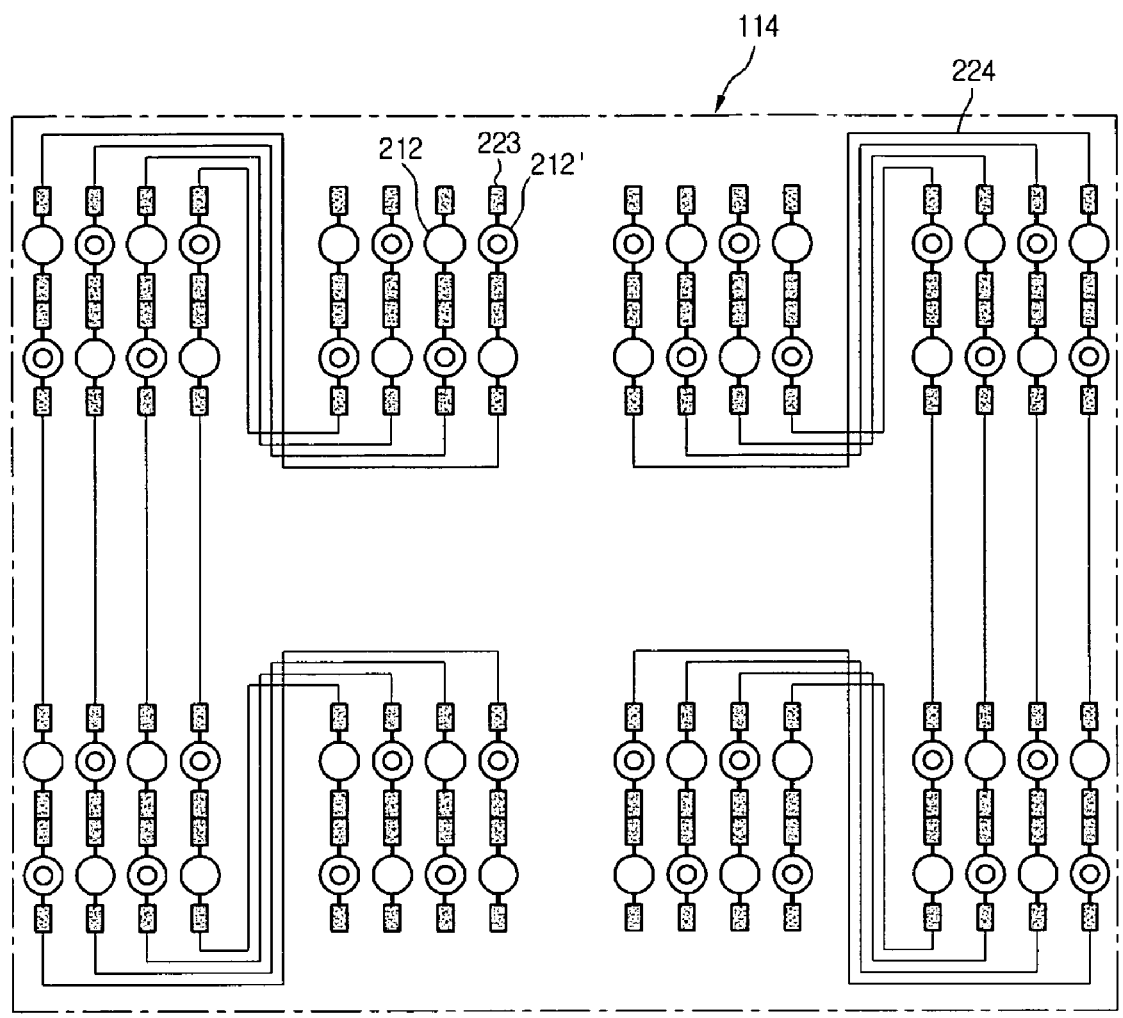
Figure 7A:
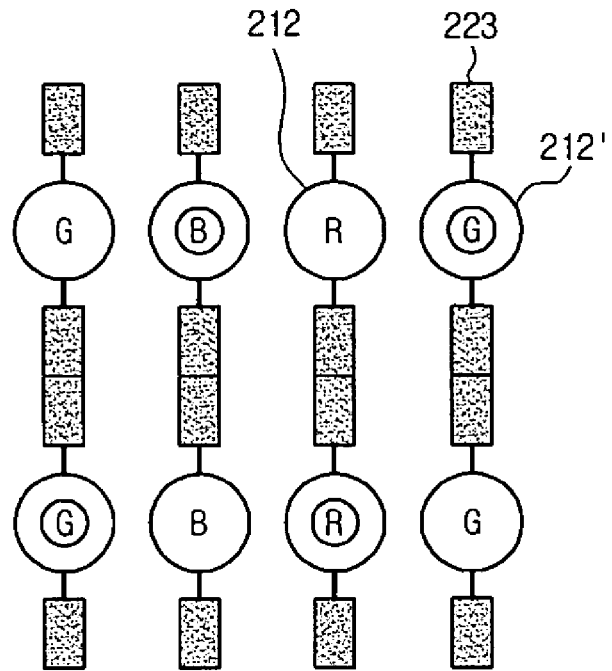
FIG. 7A is an enlarged view of a portion I of FIG. 6A and is an illustration of an embodiment of a cluster of LEDs.

FIG. 6 is a view illustrating a structure of an LED according to one embodiment, and FIG. 7A is an enlarged view of a portion I of FIG. 6.

Referring to FIGS. 6 and 7A, the LED of one embodiment includes a front emitting type LED 212 having a dome-shaped lens such that light can be emitted upward, a side emitting type LED 212' emitting light laterally, an electrode terminal 223, and a board having an electrode pattern 224 connected to the electrode terminal 223. Also, a reflection plate (not shown) may be provided on the board to reflect light toward a liquid crystal panel.

FIG. 7A shows an embodiment in which a plurality of LEDs are arranged in a cluster. The cluster of LEDs may be formed in a variety of ways. Specifically, as shown in the embodiment of FIG. 7A, the cluster includes eight LEDs arranged in two rows. The top row includes a green, blue, red, and green LED and the bottom row includes a green, blue, red, and green LED. Also, in the top row, the blue and second green LEDs are side-emitting LEDs and in the bottom row, the first green and the red LEDs are side-emitting LEDs. The remaining LEDs are front-emitting LEDs.

The embodiment shown in FIG. 7A, may be modified such that the arrangement of the colors of LEDs may be modified, or the arrangement of front-emitting or side-emitting LEDs may be modified. In other words, in alternate embodiments, the colors may be in a different arrangement than as shown in FIG. 7A. Likewise, the LEDs that are front-emitting versus side-emitting may be different in alternate embodiments.

The embodiment shown in FIG. 7A is merely one embodiment of a cluster of LEDs. A cluster of LEDs may be formed in numerous arrangements. FIGS. 7B-7I show alternate embodiments of a cluster of LEDs. These embodiments are merely exemplary. For each alternate embodiment, it should be understood that the specific arrangement of the colors and whether the LED is side-emitting or another type of LED may be modified in additional embodiments.

The front emitting type LED 212 and the side emitting type LED 212' are alternately arranged. They may be arranged in an "H" structure as shown in FIG. 6. The "H" structure has six clusters of LEDs are arranged. The six clusters are arranged in sets of two. The first set of two is arranged horizontally in the middle of the PCB 114, and the remaining two sets are arranged vertically on either side of the horizontal middle set. Four of the clusters of LEDs are located in each of the four corners of the PCB 114 and the remaining two clusters are side-by-side in the middle of the PCB 114.

The combined structure of the front emitting type LED 212 and the side emitting type LED 212' may make it possible to implement an LED having high efficiency and stabilized brightness only using a small number of LEDs 212 and 212'.

FIG. 7A is merely one embodiment for arranging a cluster of LEDs. FIGS. 7B-7I show additional exemplary embodiments. As discussed above, the color of the LED and the type of LED may be modified from the specific embodiments.

Figure 7B:
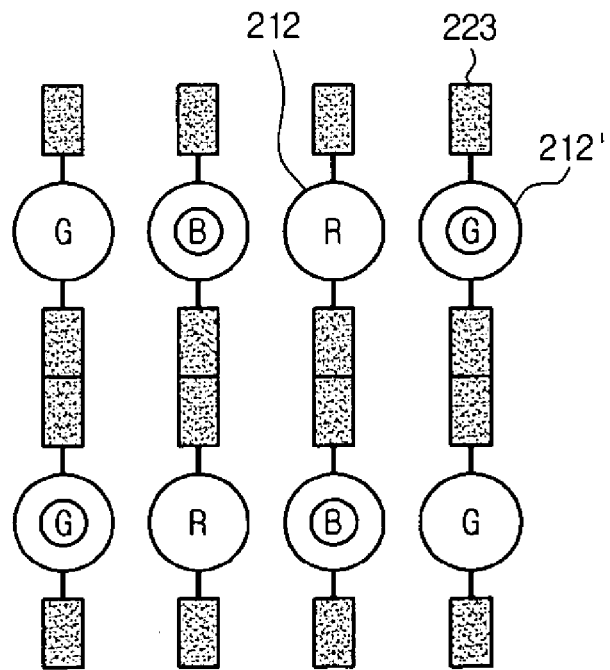
FIG. 7B is an illustration of an alternate embodiment of a cluster of LEDs.
Figure 7C:
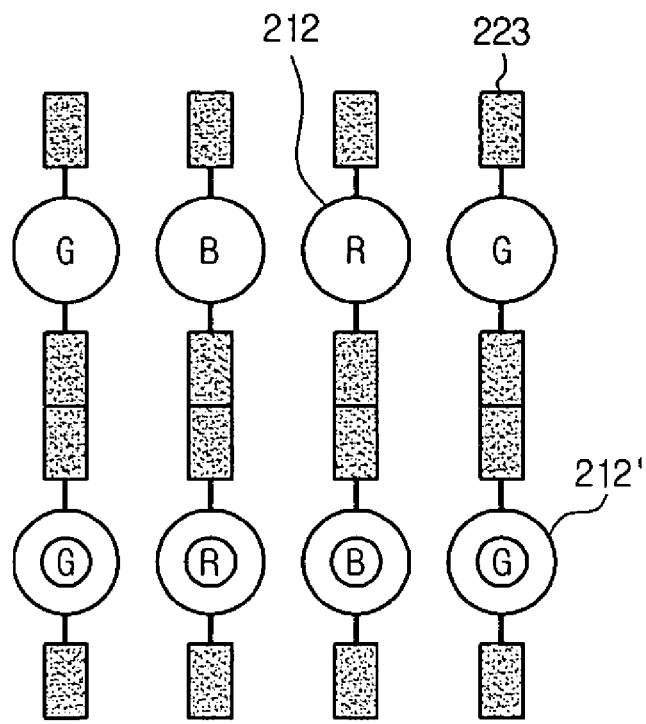
FIG. 7C is an illustration of an alternate embodiment of a cluster of LEDs.

FIG. 7B shows a cluster embodiment similar to the embodiment shown in FIG. 7A except for the arrangement of colors is modified. Specifically, the bottom row of LEDs is arranged with green, red, blue and green LEDs. The first green and the blue LED are side-emitting LEDs 212; and the red and second green LEDs are front-emitting LEDs 212. FIG. 7C is another cluster embodiment similar to FIGS. 7A and 7B, except the arrangement of LEDs is modified. Specifically, the cluster of FIG. 7C shows the top row includes front-emitting LEDs and the bottom row includes side-emitting LEDs.

As shown in FIGS. 7A-7C, the specific arrangement of LEDs within a cluster may be variable in alternate embodiments. Specifically, the arrangement of colors may be modified in alternate embodiments. In addition, the type of LED may be alternated in various cluster embodiments.

Figure 7D:
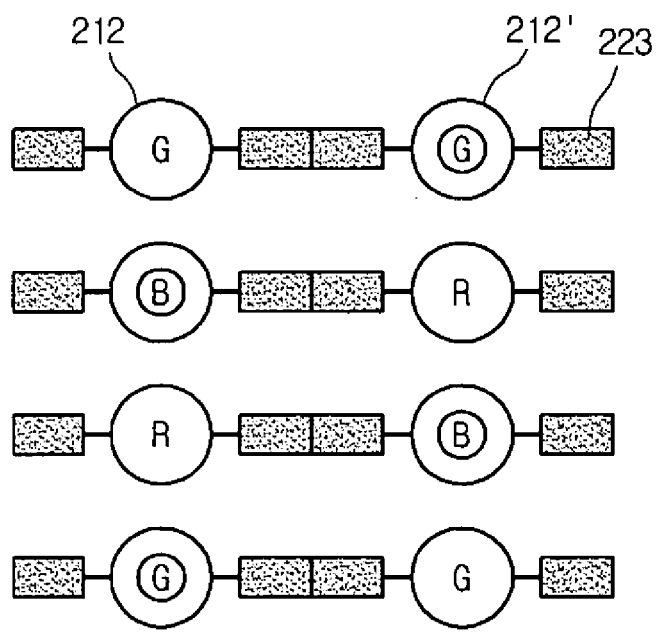
FIG. 7D is an illustration of an alternate embodiment of a cluster of LEDs.

FIG. 7D is an alternate embodiment of a cluster. The cluster of FIG. 7D is similar to the clusters of FIG. 7A-7C in that the cluster has eight LEDs arranged in pairs. However, the cluster in FIG. 7D shows the pairs of LEDs arranged vertically rather than horizontally. The LEDs that are front-emitting LEDs 212, and the LEDs that are side-emitting LEDs 212' may be varied from the specific embodiment shown in FIG. 7D, as well as the arrangement of the colors of the LEDs.

Figure 7E:
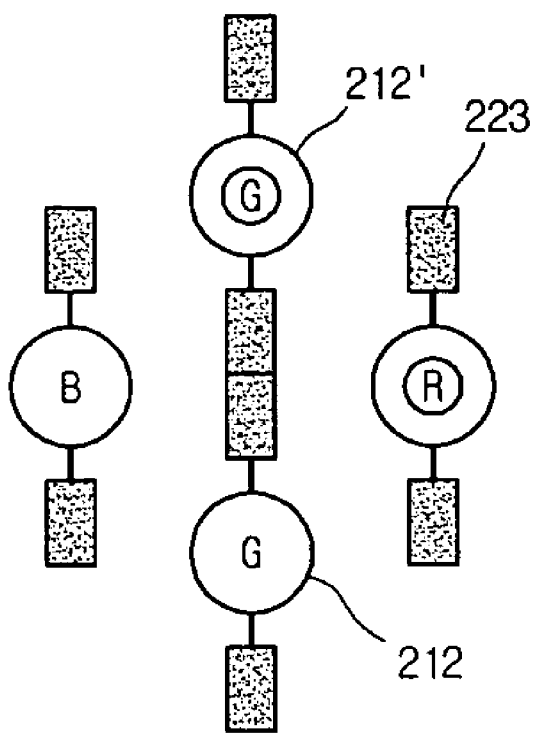
FIG. 7E is an illustration of an alternate embodiment of a cluster of LEDs.
Figure 7F:
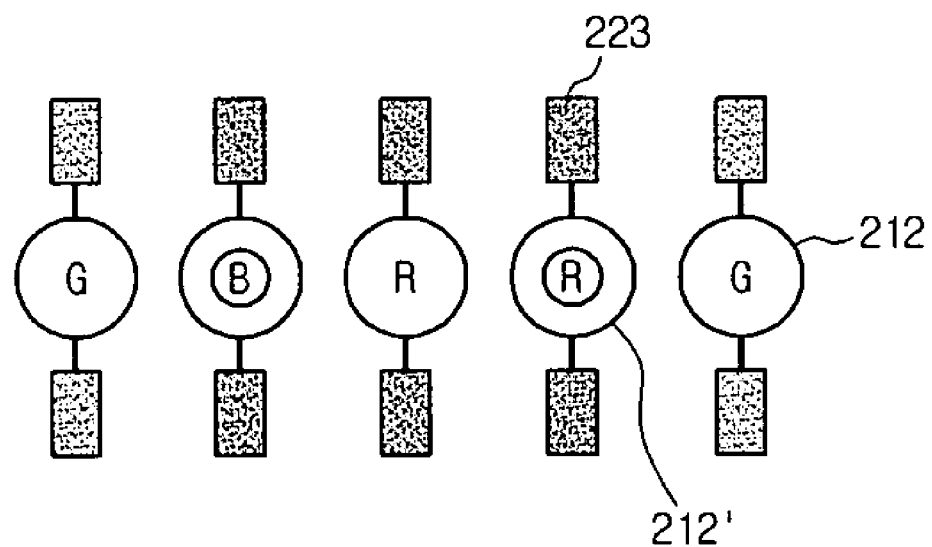
FIG. 7F is an illustration of an alternate embodiment of a cluster of LEDs.
Figure 7G:
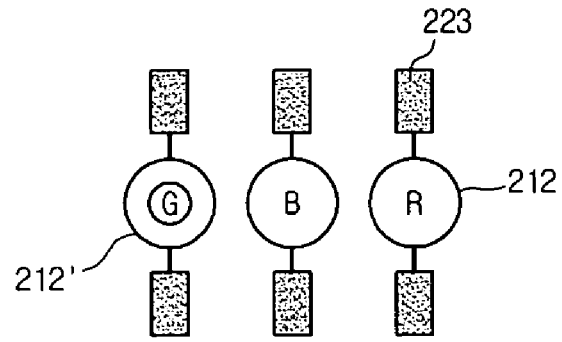
FIG. 7G is an illustration of an alternate embodiment of a cluster of LEDs.
Figure 7H:
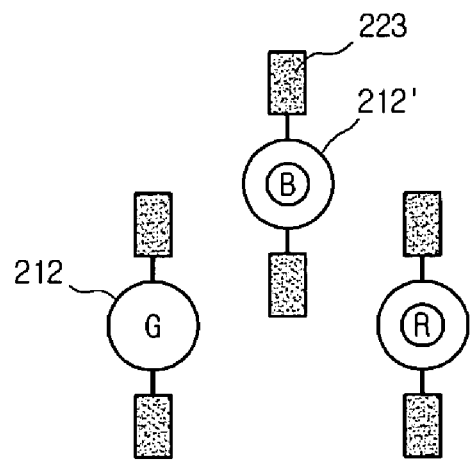
FIG. 7H is an illustration of an alternate embodiment of a cluster of LEDs.
Figure 7I:
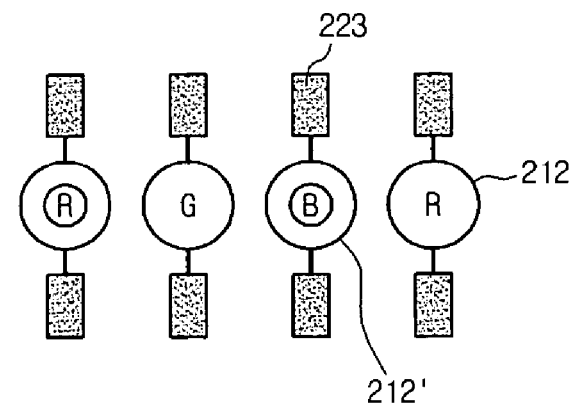
FIG. 7I is an illustration of an alternate embodiment of a cluster of LEDs.

FIG. 7E is an alternate embodiment of a cluster including four LEDs arranged in a diamond shape. FIG. 7F is an alternate embodiment of a cluster including five LEDs arranged in a row. FIG. 7G is an alternate embodiment of a cluster including three LEDs arranged in a row. FIG. 7H is an alternate embodiment of a cluster including three LEDs arranged in a triangle. FIG. 7I is an alternate embodiment of a cluster including four LEDs arranged in a row. As discussed above, these embodiments are merely exemplary. Additionally, the color of the LEDs and the type of LED may be modified from the specific embodiments shown in the Figures.

FIGS. 8-12 are views illustrating a set of clusters of LEDs according to various embodiments. FIGS. 8-12 are each an exemplary embodiment of a set of clusters. The embodiments shown in FIGS. 8-12 may include clusters from any of the cluster embodiments shown in FIGS. 7A-7I. Alternatively, the sets in FIGS. 8-12 may include cluster embodiments that are not shown in the exemplary embodiments of FIGS. 7A-7I. Additionally, it should be understood that the embodiments of a set of clusters as shown in FIGS. 8-12 are merely exemplary. Various embodiments of sets of clusters are contemplated according to the various embodiments.

Figure 8:
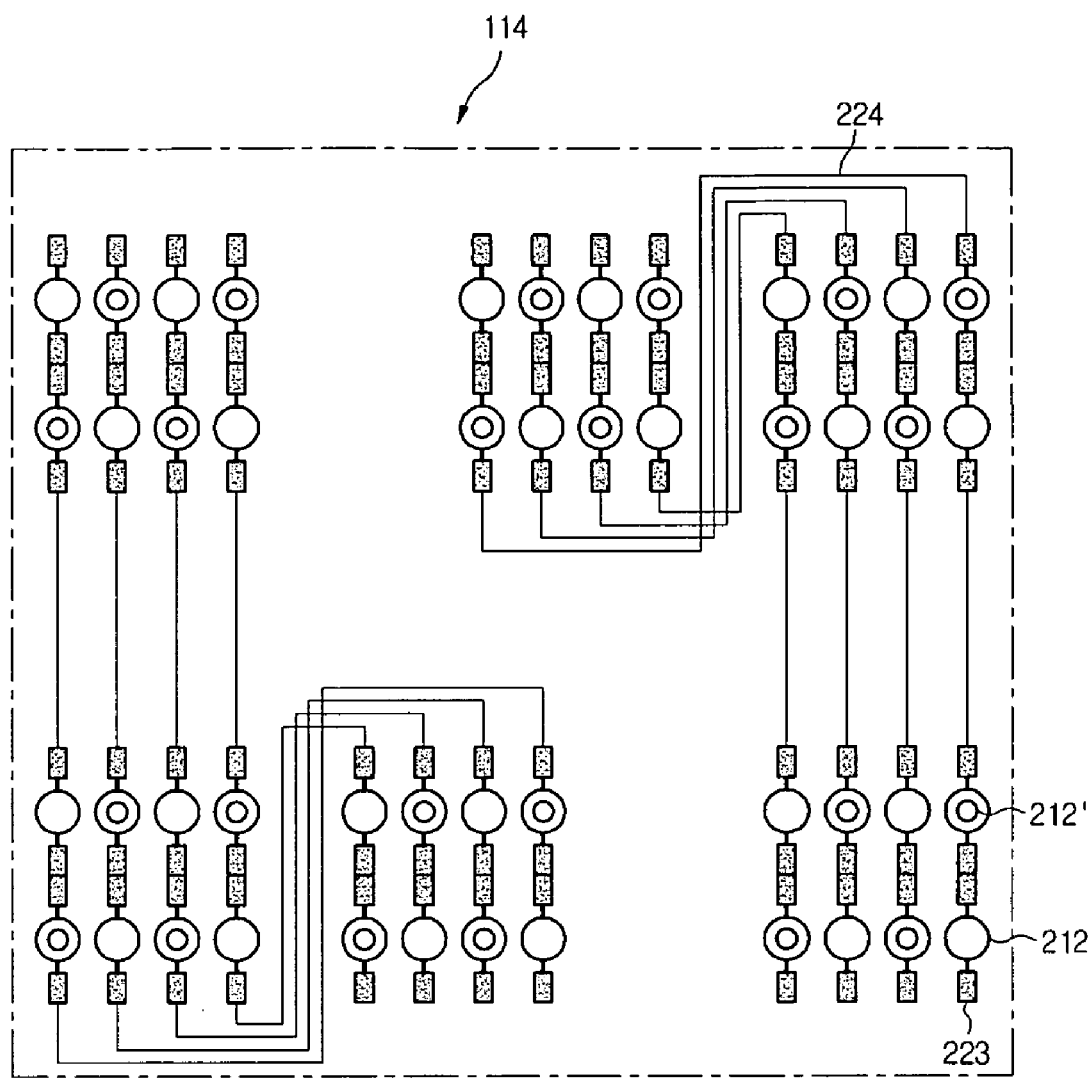
FIG. 8 is a view illustrating a set of clusters of an LED according to an embodiment.

Referring to FIG. 8, the LED of one embodiment includes a front emitting type LED 212 emitting light upward, a side emitting type LED 212' emitting light laterally, an electrode terminal 223, and a PCB 114 connected to the electrode terminal 223. Also, a reflection plate (not shown) may be provided on the PCB 114 to reflect light toward a liquid crystal panel.

The front emitting type LED 212 and the side emitting type LED 212' are alternately arranged. They may be arranged in a combination of a ""⊏"" structure and a ""⊐"" structure. That is, the ""⊐"" structure is provided at a position adjacent to the ""⊏"" structure. According to this embodiment, there may be six clusters of LEDs. Each cluster comprises 4 front emitting type LEDs 212, and 4 side emitting type LEDs 212'. Four of the six clusters of LEDs are located in the four corners of the PCB 114. The remaining two clusters are arranged on the top and the bottom of the PCB 114, but are offset from the middle. Each one of the two middle clusters are directly adjacent to corner clusters that are diagonal from each other. As shown in FIG. 6C, the upper middle cluster is to the right of the middle and the lower middle cluster is to the left of the middle. Alternatively, the two clusters could be offset in the opposite direction.

The combination of the "⊐" structure and the "⊏" structure may make it possible to implement the LED having high efficiency and stabilized brightness only using the small number of the LEDs 212 and 212'.

Figure 9:
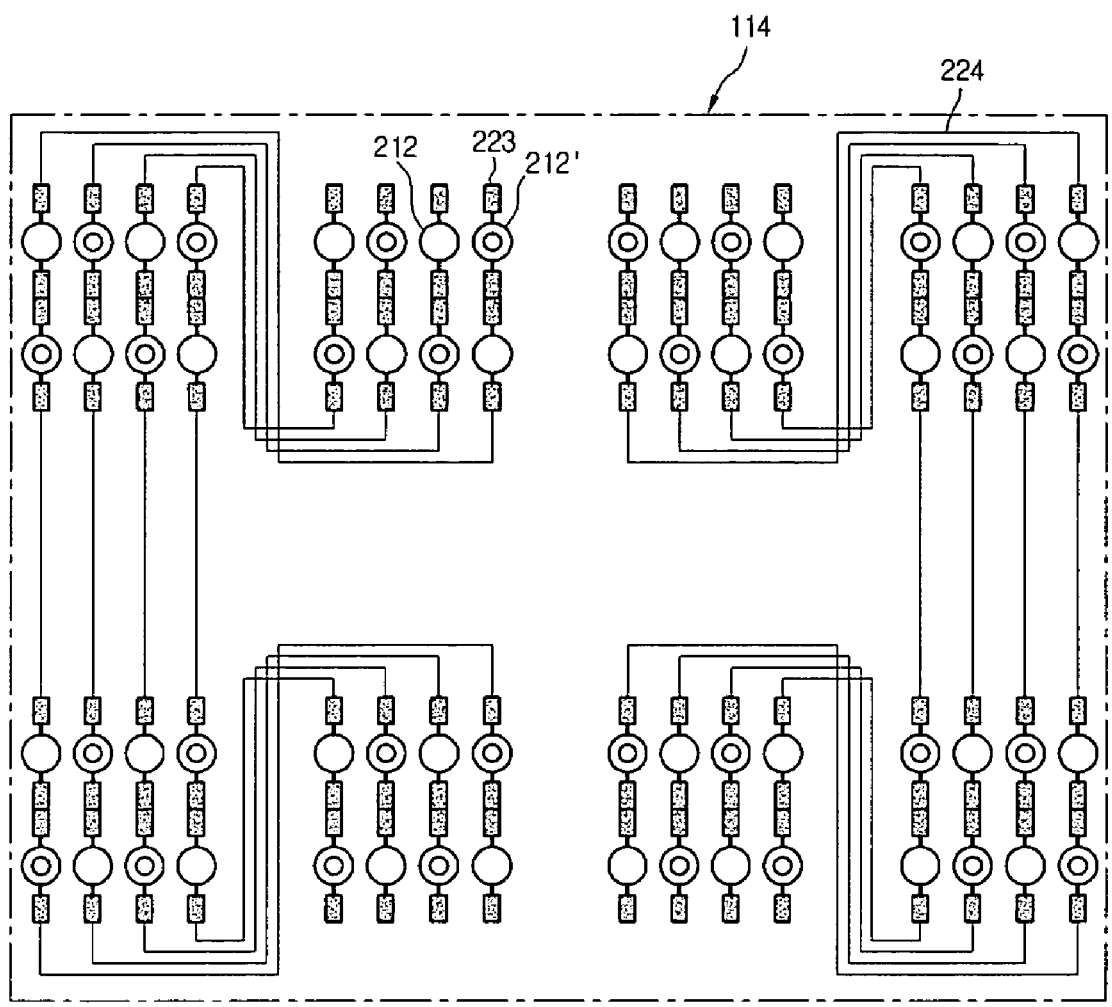
FIG. 9 is a view illustrating a set of clusters of an LED according to an alternate embodiment.

Referring to FIG. 9, the LED of one embodiment includes a front emitting type LED 212 emitting light upward, a side emitting type LED 212' emitting light laterally, an electrode terminal 223, and a PCB 114 connected to the electrode terminal 223. Also, a reflection plate (not shown) may be provided on the PCB 114 to reflect light toward a liquid crystal panel.

The front emitting type LED 212 and the side emitting type LED 212' are alternately arranged. They may be arranged in a combination of a "⊥" structure and a "⊤" structure. That is, the "⊥" structure is provided at a position adjacent to the "⊤" structure. In this embodiment, four clusters of LEDs are provided in the four corners of the PCB 114. Each of four other clusters of LEDs are located directly adjacent to each of the clusters that is located in the corners of the PCB 114.

The combination of the "⊥" structure and the "⊤" structure may make it possible to implement the LED having high efficiency and stabilized brightness only using the small number of the LEDs 212 and 212'.

Figure 10:
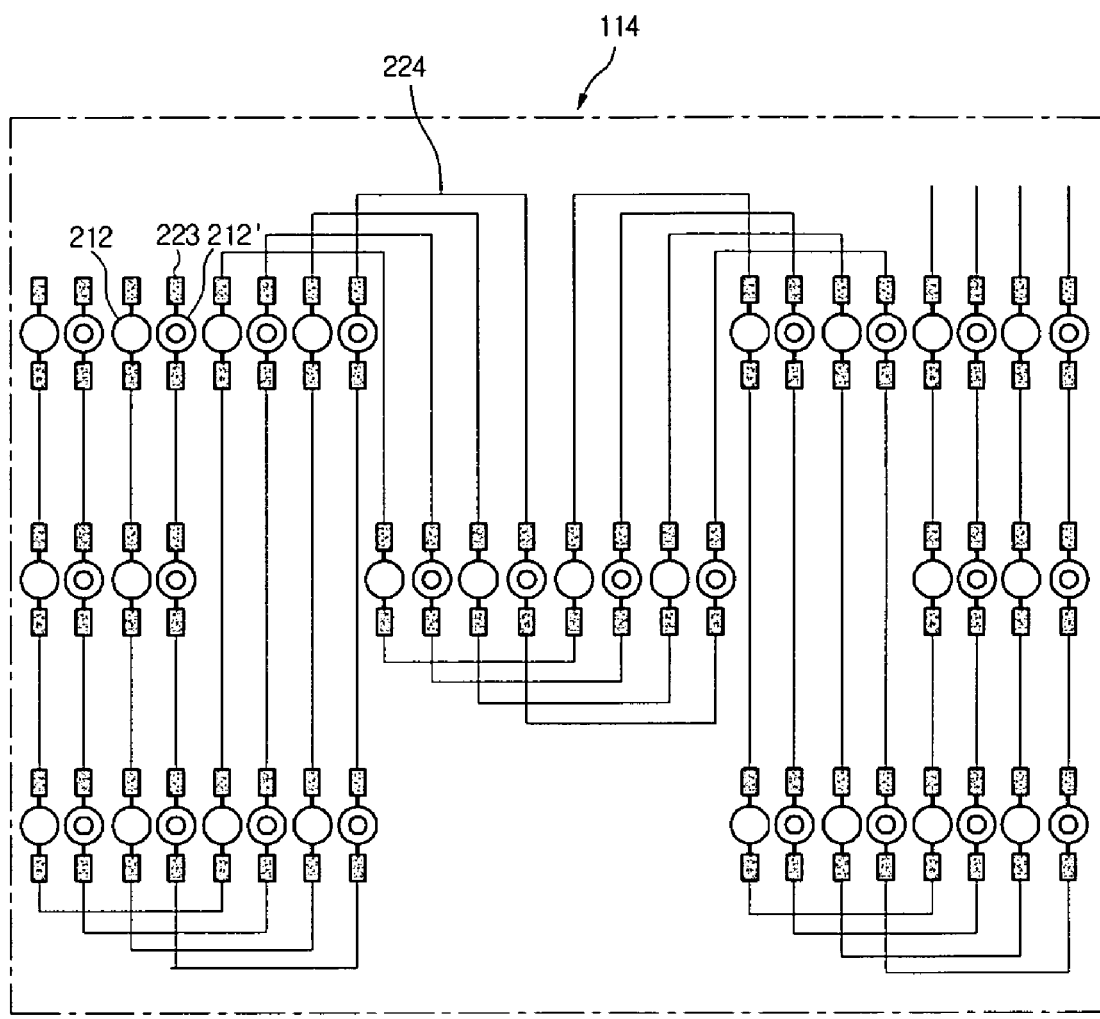
FIG. 10 is a view illustrating a set of clusters of an LED according to an alternate embodiment.
Figure 11:
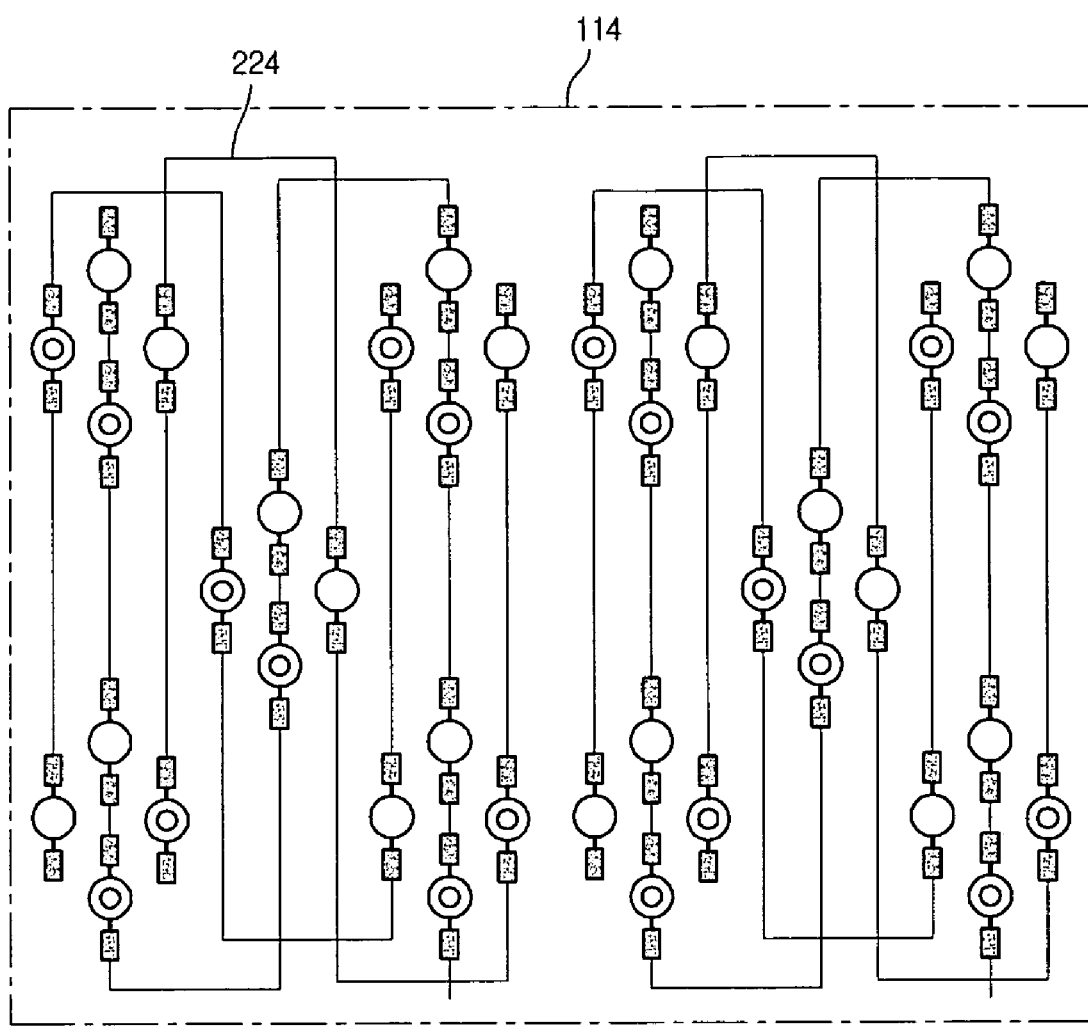
FIG. 11 is a view illustrating a set of clusters of an LED according to an alternate embodiment.
Figure 12:
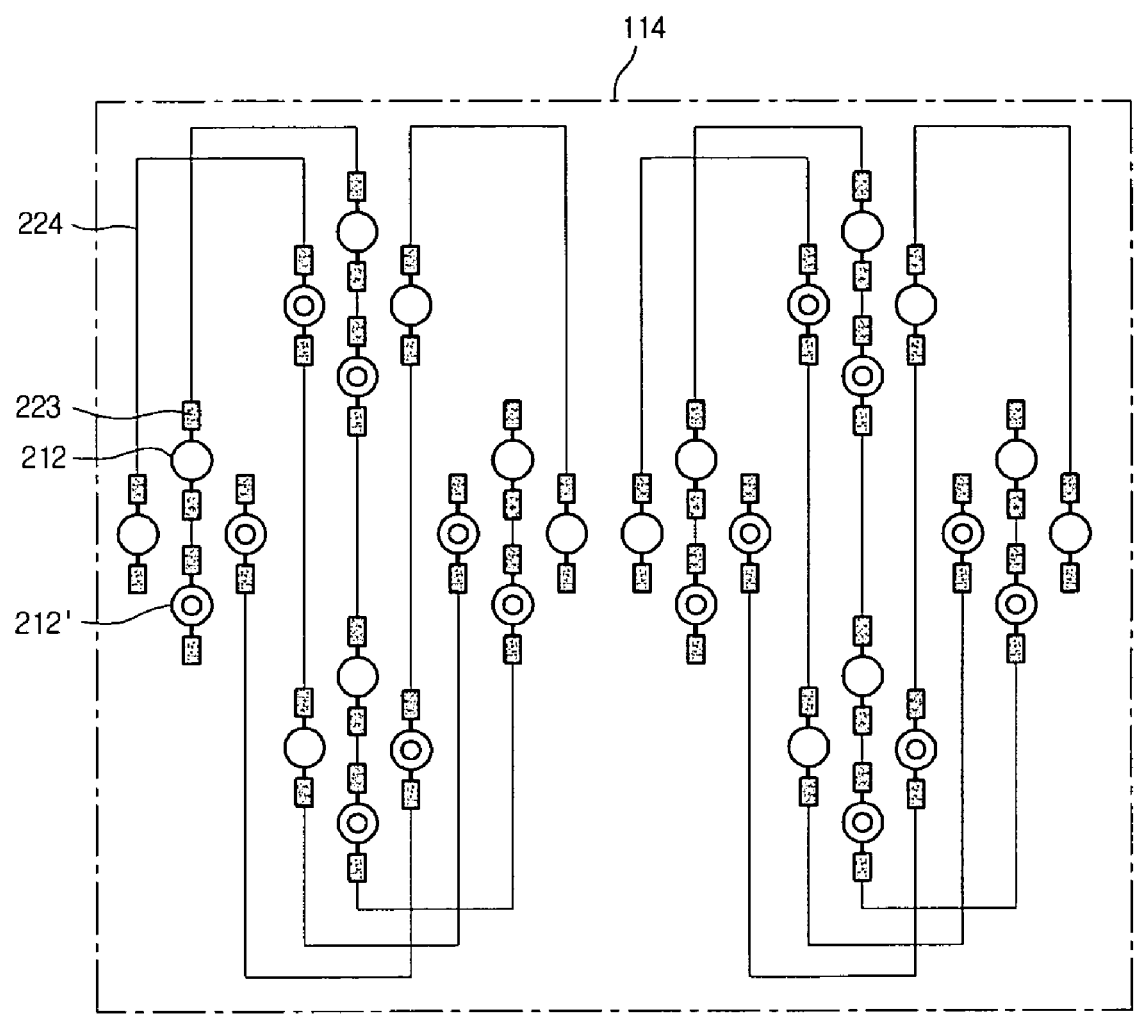
FIG. 12 is a view illustrating a set of clusters of an LED according to an alternate embodiment.

FIGS. 10-12 are additional alternate embodiments of a set of clusters. FIG. 10 is an alternate embodiment of a set of clusters. The clusters shown in FIG. 10 are not shown in the cluster embodiments of FIGS. 7A-7I. The clusters shown in this set are arranged in a row of eight LEDs. There are five of these clusters arranged such that four are in each of the corners and one is in the center of the PCB 114. Additionally, two smaller clusters are shown on either side of the PCB 114. The smaller clusters are similar to the cluster embodiment shown in FIG. 7I.

FIG. 11 is an alternate embodiment of a set of clusters. The clusters shown in FIG. 11 are similar to the cluster embodiment shown in FIG. 7E. The set of clusters shown in FIG. 11 has ten clusters arranged in a "XX" pattern.

FIG. 12 is an alternate embodiment of a set of clusters. The clusters shown in FIG. 12 are similar to the cluster embodiment shown in FIG. 7E. The set shown in FIG. 12 includes an arrangement of clusters in adjacent diamond shapes.

FIGS. 8-12 are merely exemplary embodiments of a set of clusters. Additional arrangements of clusters in a set is contemplated according to alternative embodiments. Alternate clusters may be used for the embodiments of a set of clusters than those clusters shown in FIGS. 7A-12.

Figure 13:
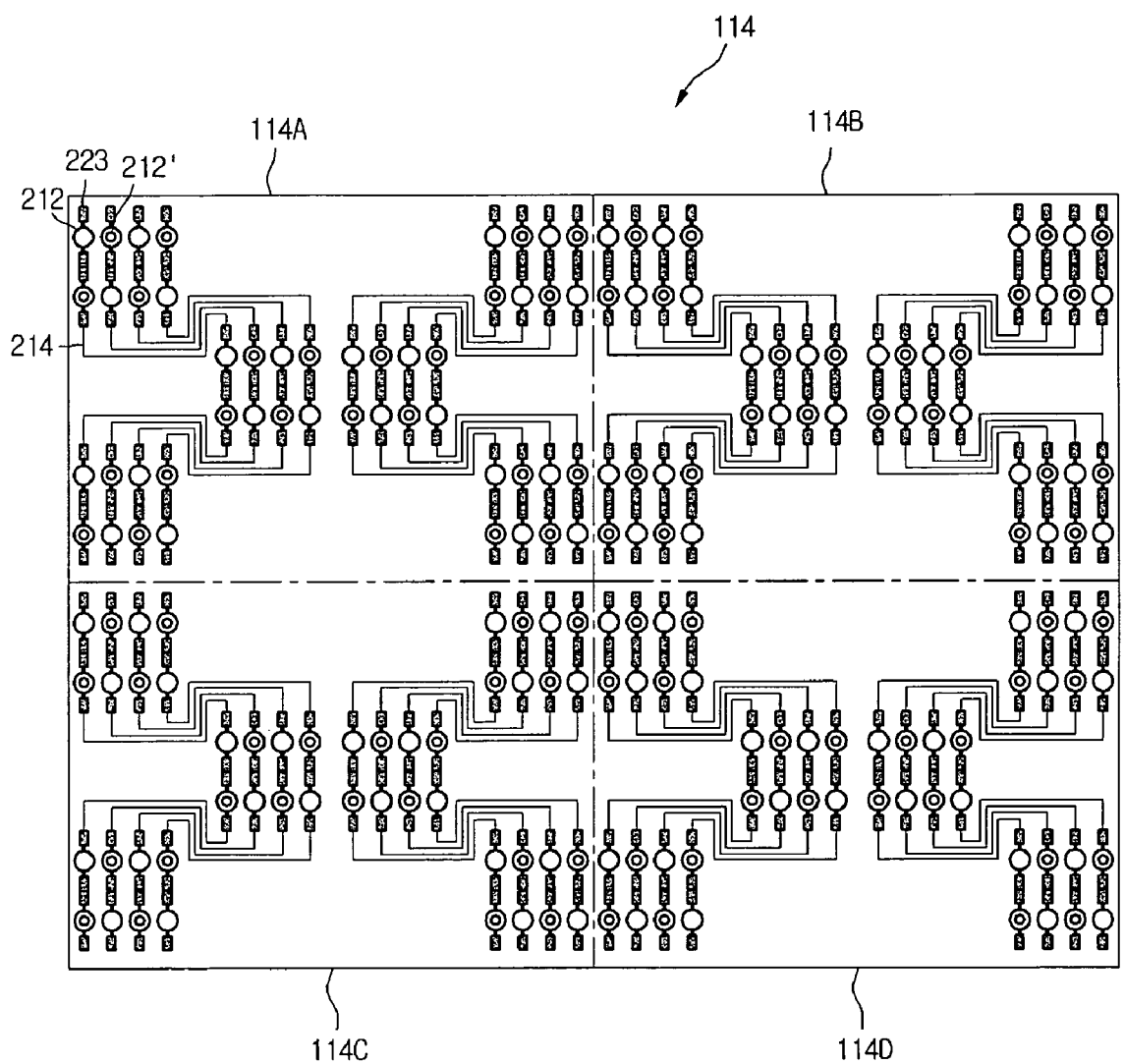
FIG. 13 is a view illustrating a structure of an LED according to one embodiment with a combination of sets of clusters.

FIG. 13 is an illustration of a combination of sets of clusters. Specifically, the embodiment of FIG. 13 is a combination of the set embodiment shown in FIG. 6. FIG. 13 shows that sets of clusters can be combined or arranged together to create a backlight assembly producing improved brightness. In alternate embodiments of combinations of sets, the clusters and the sets may be arranged or combined differently than the exemplary embodiment shown in FIG. 13.

The LCD display may include any combination of sets as shown in FIG. 13. In alternate embodiments, the display may only include a single set of any number of clusters as described above. In an additional alternate embodiment, the display may include only a single cluster.

The structures of the LEDs 212 and 212' are not limited to the structures or sets of clusters shown in FIGS. 8-12. The structures of the LEDs 212 and 212' may be modified in various arrangements without departing from the scope of the present disclosure. In other words, the arrangement of the LEDs within the clusters, the arrangement of the clusters within a set, and the arrangement of the sets for a combination of sets may all be modified in alternate embodiments.

Because the clusters include different types of LEDs, the present embodiments may implement a backlight assembly and the LCD having the same, capable of obtaining high efficiency and high brightness using the small number of LEDs. In addition, since the LCD may provide high efficiency and stabilized brightness, an intermediate light guide plate can be omitted, thereby reducing the cost of materials and the number of manufacturing processes and implement low power consumption.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight assembly comprising:
 a light source including a first light emitting diode (LED) and a second light emitting diode (LED), a main emission direction of the first LED being different from a main emission direction of the second LED;
 a board, wherein the light source is disposed on the board; and
 at least one optical sheet arranged in front of the light source,
 wherein the light direction of the first LED is emitted upwards and the light direction of the second LED is emitted laterally,
 wherein the first LED is a front-emitting LED and the second LED is a side-emitting LED, and
 wherein the light source includes a red LED, a green LED, and a blue LED, wherein the red, green and blue LEDs are the type of either the first LED or the second LED,
 wherein the first LED and the second LED are alternately arranged and the terminals of the first LED and the second LED are electrically connected to each other.

2. The backlight assembly according to claim 1, wherein the first LED includes an upper lens formed in a dome shape.

3. The backlight assembly according to claim 1, wherein the first LED and the second LED emit one of a red color, a green color, and a blue color.

4. The backlight assembly according to claim 1, wherein the light source includes at least one cluster of LEDs, the at least one cluster comprising at least one of a red LED, a green LED, a blue LED, or combinations thereof.

5. The backlight assembly according to claim 4, wherein each of the LEDs in the at least one cluster of LEDs has a first main emission direction or a second main emission direction.

6. The backlight assembly according to claim 4, wherein the light source comprises a set of the clusters.

7. The backlight assembly according to claim 6, wherein the set of clusters includes a first cluster and a second cluster, the first cluster having a different arrangement of LEDs than the second cluster.

8. The backlight assembly according to claim 6, wherein the set of the clusters is arranged such that the clusters are in at least one "X" formation.

9. The backlight assembly according to claim 6, wherein the set of the clusters is arranged such that the clusters are in at least one diamond formation.

10. The backlight assembly according to claim 6, wherein the set of the clusters is arranged such that the clusters are arranged in one of an "H" structure, a combination of a "⊐" structure and a "⊏" structure, a combination of a "⊤" structure and a "⊥" structure, or combinations thereof.

11. The backlight assembly according to claim 10, wherein the "⊐" structure and the "⊏" structure are arranged to face each other.

12. The backlight assembly according to claim 10, wherein an opening of the "⊤" structure faces an opening of the "⊥" structure.

13. The backlight assembly according to claim 4, wherein the light source comprises a combination of the sets of the clusters.

14. A liquid crystal display device comprising:
a liquid crystal panel for displaying an image;
a backlight assembly for emitting light to the liquid crystal panel, the backlight assembly including a light source in which a first light emitting diode (LED) and a second light emitting diode (LED) are adjacent to one another, wherein the first LED is a different type than the second LED, and
at least one optical sheet arranged in front of the light source
wherein the light direction of the first LED is emitted upwards and the light direction of the second LED is emitted laterally,
wherein the first light emitting diode (LED) is a front-emitting LED and the second light emitting diode (LED) is a side-emitting LED, and
wherein the light source includes a red LED, a green LED, and a blue LED, wherein the red, green and blue LEDs are the type of either the first LED or the second LED,
wherein the first LED and the second LED are alternately arranged and the terminals of the first LED and the second LED are electrically connected to each other.

15. The liquid crystal display device according to claim 14, wherein the first light emitting diode and the second light emitting diode are arranged in one of an "H" structure, a combination of a "⊐" structure and a "⊏" structure, a combination of a "⊤" structure and a "⊥" structure, and combinations thereof.

16. The liquid crystal display device according to claim 14, wherein the "⊐" structure and the "⊏" structure are arranged to face each other.

17. The liquid crystal display device according to claim 14, wherein an opening of the "⊤" structure faces an opening of the "⊥" structure.

18. The liquid crystal display device according to claim 14, wherein the first LED and the second LED are arranged in a combination of at least one of an "H" structure, a "⊐" structure, a "⊏" structure, and a "⊤" structure, and a "⊥" structure.

19. A backlight assembly comprising:
one or more front-emitting light emitting diodes (LEDs);
one or more side-emitting diodes (LEDs) located adjacent to at least one of the front-emitting LEDs;
at least one board housing the front-emitting LEDs and the side-emitting LEDs, and
at least one optical sheet arranged in front of the front-emitting light emitting diodes (LEDs) and the side-emitting diodes (LEDs)
wherein the light direction of the front-emitting LEDs is emitted upwards and the light direction of the side-emitting LEDs is emitted laterally, and
wherein the front-emitting diodes (LEDs) and the side-emitting diodes (LEDs) include a red LED, a green LED, and a blue.

20. The backlight assembly of claim 19, wherein a cluster of adjacent front-emitting LEDs and side-emitting LEDs are arranged on the at least one board.

21. The backlight assembly of claim 20, wherein the cluster comprises a plurality of pairs, each of the plurality of pairs including a front-emitting LED and a side-emitting LED.

22. The backlight assembly of claim 19, wherein the at least one board comprises a plurality of clusters, each of the clusters comprising adjacent front-emitting LEDs and side-emitting LEDs.

23. The backlight assembly of claim 22, wherein four of the plurality of clusters are located in each corner of one of the at least one board, respectively, and two clusters are located near the center of the at least one board in a horizontal arrangement.

24. The backlight assembly of claim 22, wherein four of the plurality of clusters are located in each corner of the at least one board, respectively, and two clusters are each located adjacent one of the clusters in the corner of the at least one board.

* * * * *

UNITED STATES PATENT AND TRADEMARK OFFICE
CERTIFICATE OF CORRECTION

| | | |
|---|---|---|
| PATENT NO. | : 7,651,234 B2 | Page 1 of 1 |
| APPLICATION NO. | : 11/412801 | |
| DATED | : January 26, 2010 | |
| INVENTOR(S) | : Dae San Lim | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 186 days.

Signed and Sealed this

Twenty-third Day of November, 2010

David J. Kappos
*Director of the United States Patent and Trademark Office*